Figure 1:
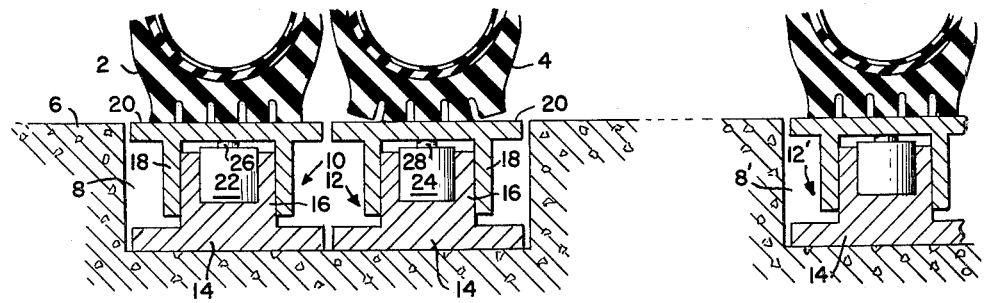

Feb. 6, 1962     J. P. GALLAGHER     3,019,642

TIRE CHECKING APPARATUS

Filed Aug. 8, 1958

INVENTOR.
JOHN P. GALLAGHER
BY
ATTORNEYS 3,019,642
TIRE CHECKING APPARATUS
John P. Gallagher, % 620 Palairet St., Philadelphia, Pa.
Filed Aug. 8, 1958, Ser. No. 753,909
6 Claims. (Cl. 73—146)

This invention relates to tire checking apparatus particularly designed for securing balance of loading of multiple tire wheels of burden vehicles.

For the carrying of heavy loads trucks and trailers are commonly provided with wheels having two or more tires for the purpose of distributing the load among the tires without individually overloading them. The object of this arrangement is defeated if the multiple tires are, in fact, not evenly loaded because of the existence of various conditions. If the tires associated with a single wheel were, in fact, of the same outside diameter, then the loads which they would sustain would depend upon inflation pressure to at least a major extent. With this situation in mind, inflation pressures are checked periodically and when the several tires of a single wheel group are found to be inflated to the same pressure an assumption has been made that the several tires are substantially equally sharing the load.

The assumption so made is seldom justified even as a good approximation, and in many normal conditions it is completely unjustified. The obviousness of the last statement will be apparent if it is assumed that of a pair of dual tires on a single wheel one has a diameter which is appreciably smaller than that of the other. If the vehicle having this condition is unloaded, it may very well happen that if the two tires are inflated to the same pressure, one of them may not actually touch the road at all. Under loading, the flattening out of the road-contacting portion of the larger diameter tire may well permit the smaller diameter tire to engage the roadway and flatten out in contact therewith. However, the load carried by a tire is equal to its pressure in pounds per square inch multiplied by the effective area of application of the pressure which depends on the road contact, and the loads on the two tires may be very different due to the fact that the effective road contacting area of one and the actual distribution of forces on the tread thereof are quite different from those of the other, the inflation pressures being the same. Such unbalanced conditions are particularly prevalent in the use of recapped tires, the diameters of which are not closely controlled.

The present invention has as its primary object the direct determination of the individual loads sustained by the several tires of a multiple tired wheel. If it is found, through the use of the apparatus, that the tires are actually sustaining rather different loads, the situation may be susceptible to correction merely by readjustment of the inflation pressures of the tires, provided that, consistent with this operation the correction may be secured with the individual tire pressures within permissible ranges for the tires involved. However, if the condition cannot thus be corrected, it may be necessary to change at least one of the tires to secure a balanced condition. Life of the tires may be greatly increased by taking corrective steps since both tires of an unbalanced set may be damaged, one of them by overload and the other by abrasion with the roadway due to intermittent contacts or large variations of load under bouncing conditions.

While the apparatus may take a simpler form, in accordance with the invention, in which the loads of the tires of a multiple set are individually indicated, an apparatus of such type necessarily requires some calculation to determine a proper evaluation of the condition existing. A further object of the invention, accordingly, is to provide a load checking apparatus in which the condition of each tire of a group may be given in terms of the ratio of its load to the total load on its wheel or to the load being sustained by a companion tire or tires. Indication of the last mentioned type is particularly desirable since it makes it more readily possible to estimate the conditions which would exist under different degrees of loading. For example, suppose a truck leaving its home garage where measuring apparatus is provided is unloaded but is expected to pick up and transport a heavy load later. If a check of a pair of dual tires was made with the truck unloaded and it appeared that one of them was only sustaining thirty percent of the total wheel load, it could be deduced that a generally similar disproportion of the loading would exist when the truck was fully loaded. The numerical difference between the loads of the tires in pounds is not particularly significant, though the relative percentage loadings will be significant. In accordance with the invention there is provided an apparatus which directly indicates percentage loading of the tires. Further, considering that the checking may be made by unskilled labor, the apparatus is adapted to signal an unbalanced load condition which involves a percentage deviation in excess of an amount which is considered permissible.

Figure 2:
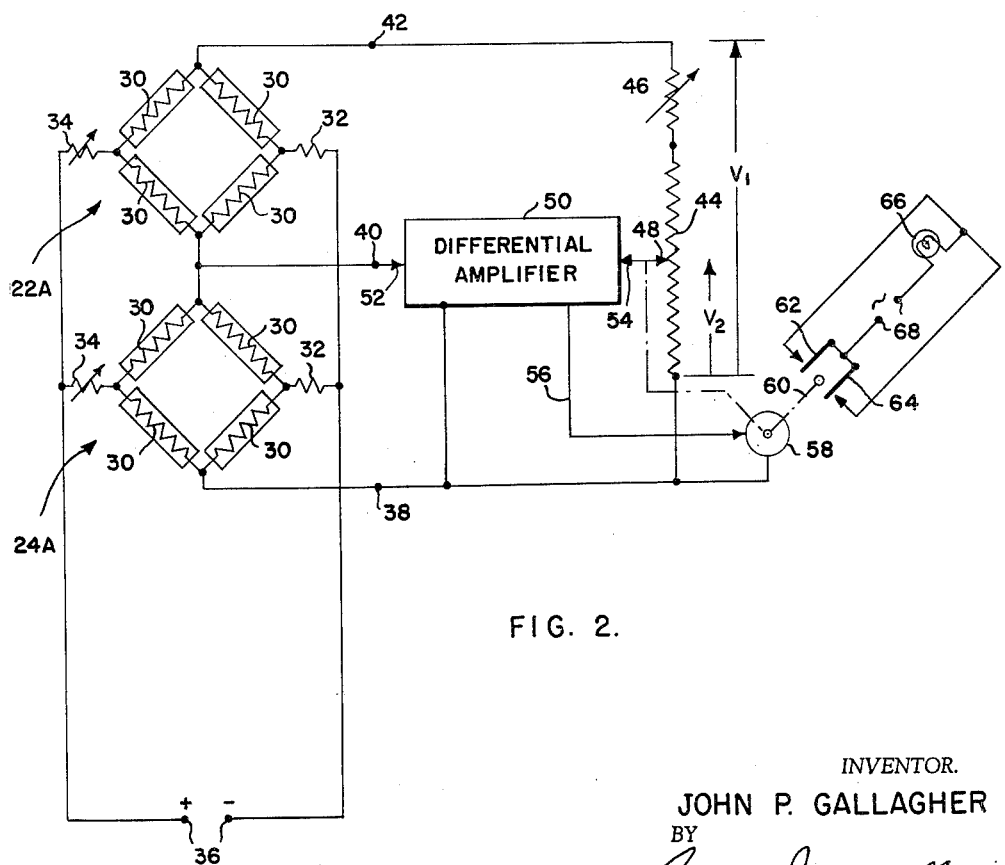

The foregoing and other objects of the invention particularly relating to details of construction and operation will become apparent from the following description, read in conjunction with the accompanying drawing, in which:

FIGURE 1 is a vertical cross-section of a portion of a roadway in which the apparatus in accordance with the invention is provided; and FIGURE 2 is a wiring diagram showing an embodiment of the invention including a detecting and indicating system designed particularly to indicate percentages of loading.

While trailers for extremely heavy loads are sometimes provided with wheels having more than two tires, the great majority of trucks and trailers which are provided with multi-tired wheels have only two tires per wheel and the invention will be described with reference to measurements of dual tired wheels, from which description it will be evident how the invention may be extended, if desired, to measuring in the cases of wheels provided with tires in excess of two.

There are indicated at 2 and 4 the tires of a double set associated with a single wheel, and for purposes of illustration these wheels are shown, in exaggerated form, as they might appear under conditions of substantial unbalance. It will be noted that the left-hand tire 2 has the complete width of its tread in engagement with a road plane. The right-hand tire 4, on the other hand, is contacting the road plane only in its central portion. Assuming that the two tires were inflated to the same pressure, it will be evident that the left-hand tire would be sustaining much more of the total wheel load than the right-hand tire.

A portion of a roadway with which the measuring apparatus is associated is indicated at 6 and this might be, for example, at the exit from a garage or parking lot. Since, for each axle, it would be desirable to make measurements of both pairs of tires associated with the two wheels, the measuring apparatus would desirably be duplicated in pits 8 and 8' spaced to correspond with the spacing of the wheels. Since the two pits would contain identical apparatus, only one need be described.

The apparatus for a single wheel comprises the side by side measuring assemblies 10 and 12 so located as to be engaged by the adjacent tires of a single pair. The two measuring assemblies are identical, each comprising a base 14 fixed in the bottom of the pit 8 by securing bolts (not shown) embedded in the concrete, and providing a guide 16 such as a cylinder designed to provide for vertical movement of a platform 20 which may be in the form of a casting having a cylinder 18 sliding on the base cylinder 16, the diameter and fit being such as to prevent tilting. Keying, not shown, may be provided to prevent rotation about a vertical axis.

In a socket in each of the bases 14 there is located a load cell, the two cells being indicated at 22 and 24 and having the respective loading buttons 26 and 28 projecting upwardly therefrom for support of the platforms 20. Details of these load cells need not be described herein since they are conventional and available on the market. In brief, each comprises a metallic rod surmounted by a button such as 26 and 28, the rods being mounted to withstand lateral deflection and to be compressed by a vertical load applied to the corresponding platform. Each rod or column has mounted thereon four strain gauges, two being mounted horizontally and two vertically, the arrangement being such as to provide for temperature compensation and for the association of the resistance wires of the gauges in a bridge. Additionally, calibration and terminal adjustment resistors are embodied in each cell. External leads which are not shown in FIGURE 1 may pass through the bases 14 and conduits in the roadway, providing connections to the measuring apparatus.

Reference may now be made to FIGURE 2 which shows the electrical connections of the strain gauge resistances to each other and to measuring apparatus. The strain gauge bridges are indicated generally at 22A and 24A, these bridges corresponding to the cells 22 and 24. The strain gauge resistances 30 are connected in bridges, such connection being conventional for the cells here illustrated. Inputs to the bridges are provided through the resistances 32 (which constitute the temperature compensating resistors and calibration resistors) and through the adjustable resistors 34 arrange to provide identical input currents to the bridges 22A and 24A from a current supply source 36 which is illustrated as a direct current source for the particular measuring apparatus shown in FIGURE 2. The voltage supply at 36 is generally of the order of four to six volts. The output terminals of the bridges are connected to the terminals 38, 40 and 42, the bridges being arranged in series with their intermediate connection to the central terminal 40. As will be evident from FIGURE 2, the output from the bridge 24A is provided between terminals 38 and 40, while the output from the bridge 22A is provided between the terminals 40 and 42. Between the terminals 38 and 42 there then appears an output which corresponds to the total load on the wheel with which the two tires undergoing measurement are associated.

While various alternative forms of measuring apparatus may be used, to secure an indication of ratio of the individual tire loads, there may be used, consistent with a direct current supply, the type of apparatus specifically illustrated in FIGURE 2. This apparatus comprises a potentiometer 44 in series with a zero adjusting resistor of low resistance value 46, the potentiometer resistance and the adjusting resistance being in series between the terminal 38 and terminal 42. The adjustable potentiometer contact is indicated at 48.

Shown at 50 is a differential amplifier which is desirably of the high gain type such as is illustrated and described on page 485 of "Vacuum Tube Amplifiers," volume 18, Radiation Laboratory Series, McGraw-Hill Book Company, Inc., 1948. This type of differential amplifier has the property of providing at its output terminal 56 a highly amplified signal which is proportional to the difference of potentials of its input terminals 52 and 54 with respect to a reference terminal which is provided by terminal 38. Operating between positive and negative potentials with respect to the reference terminal 38, an internal adjustment of the differential amplifier may be provided to secure a zero output at 56 when the potentials at 52 and 54 are equal. When these potentials deviate from equality, positive or negative outputs are respectively provided at 56 depending upon the sign of the unbalance.

A suitable direct current motor, provided with reduction gearing, is indicated at 58 and is driven by the output at 56 in one direction or the other depending upon the sign of this output. The motor may have either a direct current field winding or the field may be provided by a permanent magnet. The motor and reduction gearing is mechanically connected to the potentiometer contact 48 to traverse this contact along the potentiometer resistance 44. The differential amplifier terminal 52 is connected to terminal 40 and the contact 48 is connected to terminal 54.

The arrangement described provides automatic drive of the potentiometer contact 48 to secure equality of the inputs at 52 and 54, whereupon the position of the adjustable contact 48 read against a scale indicates directly the ratio, in the present instance, of the output from the bridge 24A to the combined outputs of both bridges 24A and 22A, which result is equivalent to an indication of the proportion of the load on the cell 24 with respect to the total load on both cells 22 and 24, the latter being the total wheel load. The scale associated with the contact 48 may be calibrated in terms of the percentage of the total load sustained by the tire 4 or in terms of the ratio of the loads, percentagewise, sustained by the two tires. That this is the case will be evident from considering the fact that the position of the contact 48 automatically assumed under the motor control is dependent upon the ratio of the two potentials $V_2$ and $V_1$. It will be evident that the relative loads sustained by the two tires are thus directly indicated, and from the indication which is secured the corrective measures which may be required are clearly indicated.

While indicating apparatus has been shown, it will be evident that the potentiometer arrangement may be of recording type so as to provide a permanent record of the condition of the tires of the truck or trailer at the time of measurement. More elaborately, there may, of course, be used a conventional potentiometer printing apparatus by which permanent record cards may be secured to give a check on the history of utilization of any individual tire. It will be obvious that additional apparatus may be connected to the terminals 38, 40 and 42 to secure a direct measurement, in pounds, of wheel loads, and these may be combined for both wheels on an axle to give total axle loads such as are generally of interest in connection with motor vehicle loading laws.

If actual numerical measurements are not required, there may be provided a visual signalling means indicating when the unbalance of the tires of a pair exceeds a permissible ratio figure. For this purpose, the motor-reduction gearing shown at 58 may be provided with an arm 60 arranged to close one or the other of spaced switches 62 and 64 arranged in circuit with a warning lamp 66 and a source of current at 68 to indicate when the ratio of loadings exceeds certain bounds preset by the spacing of the switches 62 and 64. This last arrangement may be particularly used where routine checking is done by unskilled labor.

The particular indicating or recording apparatus described in the foregoing may, of course, take numerous forms depending upon whether the bridges are energized with direct or alternating current. The signals from the bridges are quite small, and conventional chopping means may be used to provide for alternating current amplification of a direct set of signals, with synchronous rectification to secure a phase-related output which may serve for balance of a potentiometer. If alternating excitation is provided to the bridges, diode switching means may be employed to secure from successive half cycles signals of the respective bridge loads or of one of them with respect to the total load. Numerous such arrangements will be apparent to those skilled in the art and accord-

What is claimed is:

1. Apparatus for the determination of the relative loads sustained by a plurality of tires mounted on a single wheel of a motor vehicle, for the purpose of evaluating wear conditions of such tires, comprising means providing a plurality of platforms defining a portion of a roadway and located closely side by side to sustain individually the tires carried by a single wheel of such vehicle, means individually associated with each of said platforms to provide an output signal as a measure of the load on its associated platform, and load indicating means responsive to said signals.

2. Apparatus according to claim 1 in which the last mentioned means provides an indication of the ratio of said platform loads.

3. Apparatus according to claim 1 in which said output providing means are constituted by strain gauge cells.

4. Apparatus according to claim 2 in which said output providing means are constituted by strain gauge cells.

5. Apparatus according to claim 1 in which the last mentioned means comprises a self-balancing potentiometer energized by the sum of said output signals and provides a signal equal to one of said output signals.

6. Apparatus according to claim 1 in which the last mentioned means provides a warning signal when the ratio of said output signals deviates from a predetermined range.

References Cited in the file of this patent

UNITED STATES PATENTS

| | | |
|---|---|---|
| 1,849,730 | Morse | Mar. 15, 1932 |
| 2,681,564 | Jeromson et al. | June 22, 1954 |
| 2,735,291 | Quinn | Feb. 21, 1956 |